United States Patent [19]

Nguyen et al.

[11] Patent Number: 5,055,368

[45] Date of Patent: Oct. 8, 1991

[54] ELECTROPHOTOGRAPHIC RECORDING ELEMENTS CONTAINING TITANYL PHTHALOCYANINE PIGMENTS AND THEIR PREPARATION

[75] Inventors: Khe C. Nguyen, Pittsford; Thomas R. Klose, Fairport, both of N.Y.

[73] Assignee: Eastman Kodak Company, Rochester, N.Y.

[21] Appl. No.: 485,114

[22] Filed: Feb. 23, 1990

[51] Int. Cl.$^5$ .............................................. G03G 5/06
[52] U.S. Cl. ........................................ 430/78; 241/27
[58] Field of Search ................ 430/78, 73, 58; 241/27

[56] References Cited

U.S. PATENT DOCUMENTS

| | | | |
|---|---|---|---|
| 4,555,467 | 11/1985 | Hasegawa et al. | 430/110 |
| 4,701,396 | 10/1987 | Hung et al. | 430/58 |
| 4,728,592 | 3/1988 | Ohaku et al. | 430/76 |
| 4,785,999 | 11/1988 | Takijiri | 241/26 |

FOREIGN PATENT DOCUMENTS 117437 5/1986 Japan .

*Primary Examiner*—John Goodrow
*Attorney, Agent, or Firm*—David F. Janci

[57] ABSTRACT

An electrophotographic recording element having a layer formed from a liquid composition comprising polymeric binder and dispersed photoconductive titanyl phthalocyanine particles. The titanyl phthalocyanine particles have a particle size up to about 0.2 micrometer and are characterized by certain X-ray diffraction characteristics and the layers are characterized by certain spectral absorption ranges. The coating composition comprises finely-divided photoconductive titanyl phthalocyanine particles dispersed in a solvent solution of polymeric binder and is prepared by the steps of (1) milling a titanyl phthalocyanine pigment with milling media comprising inorganic salt and non-conducting particles under shear conditions in the substantial absence of the solvent to provide pigment having a particle size up to 0.2 micrometer, (2) continuing the milling at higher shear at a temperature up to about 50° C. to achieve a perceptible color change of the pigment particles, (3) rapidly increasing the temperature of the milled pigment by at least 10° C., (4) separating the milled pigment from the milling media and (5) mixing the milled pigment with the solvent solution of polymeric binder to form the coating composition.

16 Claims, 3 Drawing Sheets 5,055,368

ELECTROPHOTOGRAPHIC RECORDING ELEMENTS CONTAINING TITANYL PHTHALOCYANINE PIGMENTS AND THEIR PREPARATION

FIELD OF THE INVENTION

This invention relates to electrophotographic recording elements containing titanyl phthalocyanine pigments and a method for preparing coating compositions used in the preparation of such electrophotographic elements. More particularly, the invention relates to a method of making an electrophotographic coating composition comprising a stable dispersion of a finely-divided titanyl phthalocyanine pigment dispersed in a solvent solution of a polymeric binder and to an electrophotographic element prepared using such a composition.

BACKGROUND

In electrophotography an image comprising an electrostatic field pattern usually of non-uniform strength (also referred to as an electrostatic latent image), is formed on an insulative surface of an electrophotographic element comprising at least a photoconductive layer and an electrically conductive substrate. Several types of electrophotographic recording elements are known for use in electrophotography. In many conventional elements, the active photoconductive or charge-generation materials are contained in a single layer. This layer is coated on a suitable electrically conductive support or on a non-conductive support that is overcoated with an electrically conductive layer. In addition to single-active-layer electrophotographic recording elements, various multi-active electrophotographic recording elements are known. Such elements are sometimes called multi-layer or multi-active-layer elements because they contain at least two active layers that interact to form an electrostatic latent image.

Among the many different kinds of photoconductive materials which have been employed in the aforementioned single-active layer and multi-active elements are titanyl phthalocyanine pigments such as titanyl phthalocyanine pigment or titanyl tetrafluorophthalocyanine pigment. Electrophotographic recording elements containing such pigments as charge-generation materials are useful in electrophotographic laser beam printers because they are capable of providing good photosensitivity in the near infrared region of the electromagnetic spectrum, i.e. in the range of 700–900 nm.

Unfortunately, electrophotographic recording elements of the prior art which contain photoconductive titanyl phthalocyanine pigments have typically suffered from one or more disadvantages that have significantly restricted their use. For example, as indicated in U.S. Pat. No. 4,701,396, issued Oct. 20, 1987, photoconductive titanyl phthalocyanine pigments are not readily dispersible in liquid coating compositions comprising solvent solutions of polymeric binders which are used to dispersion coat charge generation layers in electrophotographic recording elements. It is necessary that the titanyl phthalocyanine pigment be in a form, (crystalline or amorphous) that is highly photoconductive and sufficiently and stably dispersed in a coating composition to permit its being applied at a low enough concentration to form a very thin layer having high electrophotographic speed in the near infrared range.

In U.S. Pat. No. 4,701,396, the titanyl phthalocyanine pigment is subjected to a treatment which modifies its crystalline form and reduces its particle size so that the pigment can be dispersed in liquid coating compositions comprising a solvent solution of polymeric binder. This treatment is called "acid-pasting" which involves dissolving the titanyl phthalocyanine pigment (after extraction purification of the as-synthesized material) in cold, concentrated mineral acid, preferably sulfuric acid, and pouring the solution into ice water to reprecipitate the pigment. The precipitate is washed free of acid with water, then with an alcohol and dried. The resulting titanyl phthalocyanine pigment has a substantially smaller particle size (slightly less than 1 micrometer) than the crude pigment and is highly sensitive to radiation in the near infrared range. In commercial scale operations it is, of course, desirable to avoid using large amounts of concentrated mineral acids such as sulfuric acid because of safety and environmental considerations. It is also very costly to provide the necessary safeguards for handling such a hazardous material.

Japanese Patent Application No. 117437/86, filed May 23, 1986 (Published Unexamined Application [Kokai] No. 62/275272, published Nov. 30, 1987) describes an electrophotographic recording element that comprises a layer of a titanyl phthalocyanine pigment dispersed in a polymeric binder and exhibits sensitivity in the infrared range. The titanyl phthalocyanine pigment is an amorphous material having a particle size no more than 0.2 micrometer and exhibits no strong X-ray diffraction peaks. To achieve this particle size a chemically treated pigment, e.g. an acid pasted pigment is ground by mechanical means to reduce its particle size to no more than 0.2 micrometer.

This invention is directed toward the objective of providing electrophotographic coating compositions comprising finely-divided titanyl phthalocyanine pigments that are stably and uniformly dispersed therein and to electrophotographic recording elements prepared with such compositions. It is also an objective of this invention to provide such compositions without the need for chemical treatments such as acid-pasting.

SUMMARY OF THE INVENTION

In accordance with this invention, a certain crude titanyl phthalocyanine pigment, i.e., a crude titanyl phthalocyanine or titanyl tetrafluorophthalocyanine pigment, is subjected to a unique milling method that reduces its particle size and yields a pigment having excellent dispersability in liquid coating compositions and excellent photosensitivity in the near infrared range. Thus, this invention provides a method of making an electrophotographic coating composition having finely-divided photoconductive pigment dispersed in a solvent solution of polymeric binder which method comprises:

(1) milling under shear conditions in the substantial absence of the solvent, (a) a crude titanyl phthalocyanine pigment having the formula:

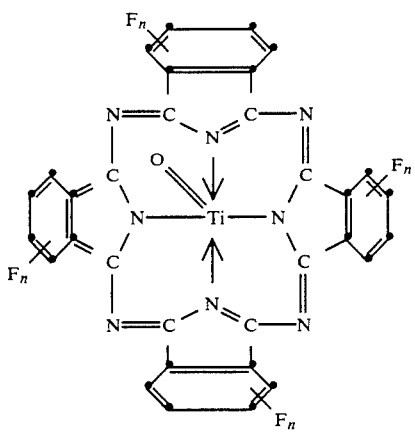

where each n is 0 or each n is 1, with (b) milling media comprising inorganic salt and non-conducting particles in a weight ratio of about 0.5:1 to 3:1 to thereby provide pigment having a particle size up to about 0.2 micrometer, (2) continuing the milling at higher shear and at a temperature up to about 50° C. to achieve a perceptible color change of the pigment, (3) rapidly increasing the temperature of the milled pigment by at least 10° C., (4) separating the milled pigment from said medium, and (5) mixing the milled pigment with the solvent solution of polymeric binder to form the coating composition.

The electrophotographic coating compositions prepared by the method of this invention are stable, uniform dispersions that can be used to coat electrophotographic elements having excellent photosensitivity in the near infrared range. Thus, the invention also provides an electrophotographic recording element having a layer formed from a liquid composition comprising polymeric binder and dispersed photoconductive titanyl phthalocyanine particles having a particle size up to about 0.2 micrometer. Additional characteristics of the element are:

(a) the titanyl phthalocyanine has the formula:

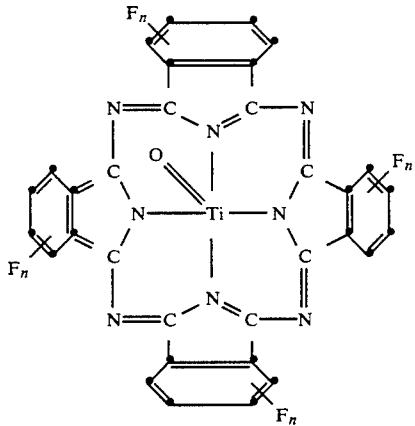

where each n is 0 or each n is 1, (b) the particles, where each n is 0, have peaks at diffraction angles ($2\theta$) of 7.4°, 16.3°, 22.4° and 27.1° and, where each n is 1, have peaks at diffraction angles ($2\theta$) of 6.8°, 15.89° and 25.27° in the x-ray diffraction pattern obtained with CuK$\alpha$ radiation, and (c) the layer has a first spectral absorption peak within the range of about 630 to about 660 nm and a second spectral absorption peak within the range of about 830 to 870 nm.

DESCRIPTION OF THE PREFERRED EMBODIMENTS

Figure 1:
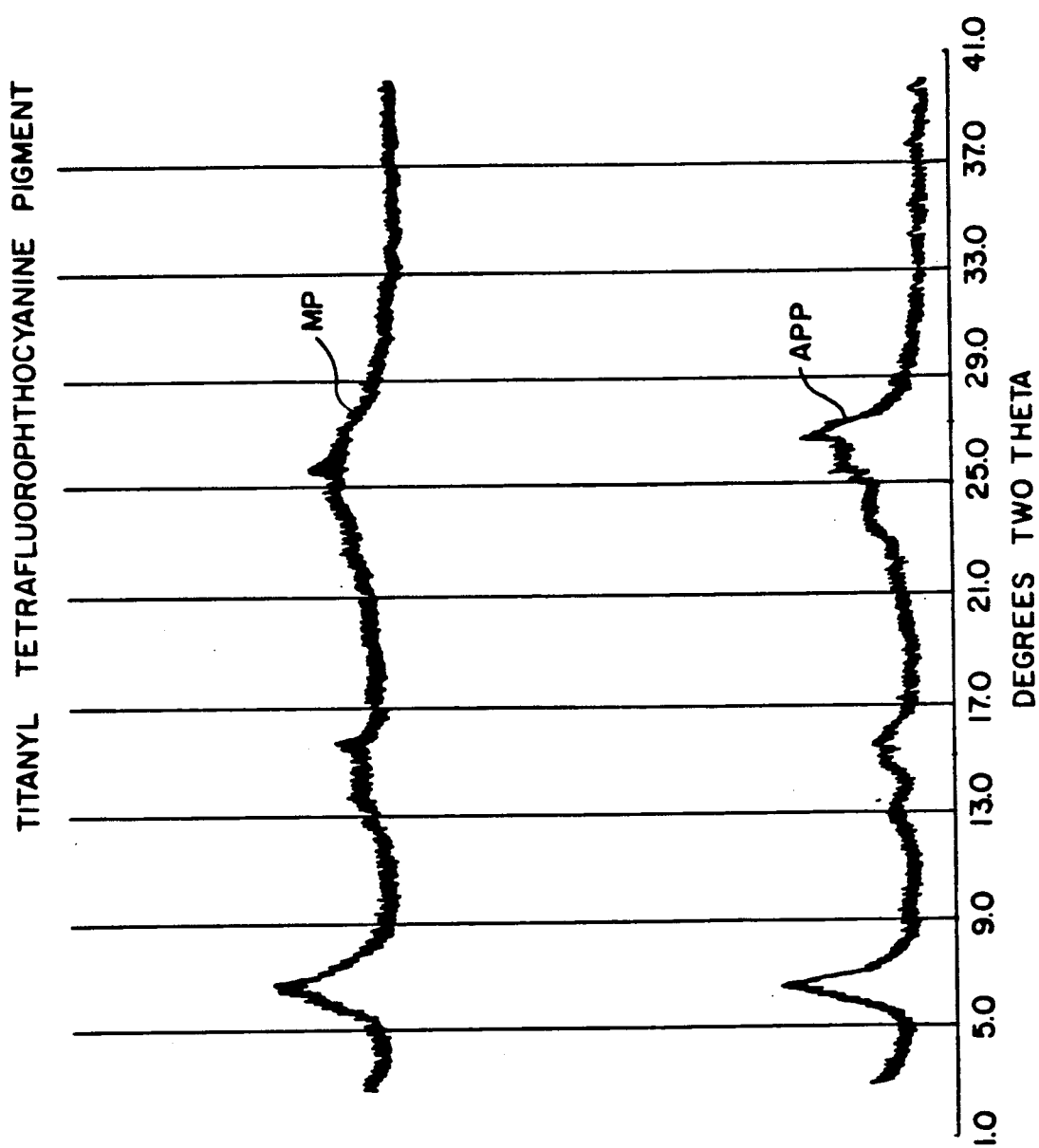
FIG. 1 is a plot representing the x-ray diffraction patterns of milled titanyl tetrafluorophthalocyanine pigment (MP) and acid pasted titanyl tetrafluorophthalocyanine pigment (APP) prepared, respectively, according to this invention and by prior art techniques, as described in the following Example 1.

The crude titanyl phthalocyanine pigment used in the method of this invention is an as-synthesized pigment and has a much larger particle size than does the electrophotographic quality pigment, i.e., the photoconductive titanyl phthalocyanine pigment. The method of this invention provides a pigment that is in a finely-divided photoconductive form capable of achieving a high degree of dispersion in electrophotographic coating compositions. Such pigment particles have a very uniform size distribution and the size of the individual particles does not exceed 0.2 micrometer. While the exact mechanism whereby the process functions to achieve the improved results is not known with certainty; in the method of the invention, the solvent and polymeric binder are not brought into association with the pigment particles until such particles are finely-divided and free from agglomerates. Accordingly, any adverse influences due to the presence of polymeric binder and/or solvent on the formation of finely-divided particles and breaking up of agglomerates and dispersion of individual particles are avoided. After milling, the particles can be effectively dispersed in the solvent solution of polymeric binder using a conventional mixing device such as a media mill or a paint shaker to form the coating composition.

The method of this invention is applied to titanyl phthalocyanine or titanyl tetrafluorophthalocyanine pigments having the formulas set forth hereinbefore. As indicated in U.S. Pat. No. 4,701,396, a titanyl fluorophthalocyanine pigment represented by such formulas where each n is one, can exist in the form of several isomers. U.S. Pat. No. 4,701,396, at column 2, lines 20-64 teaches that this results when a titanyl fluorophthalocyanine pigment is prepared by the reaction of a titanium halide with a fluorine-substituted phthalonitrile having only one fluorine substituent on the ring. This invention includes within its scope, the various isomers of titanyl tetrafluorophthalocyanine included in the aforementioned formula where each n is one. Specific examples of titanyl fluorophthalocyanines that are useful in the practice of this invention include titanyl 2,9,16,23-tetrafluorophthalocyanine, titanyl 2,10,17,24-tetrafluorophthalocyanine and titanyl 1,8,15,22-tetrafluorophthalocyanine. The titanyl tetrafluorophthalocyanine employed in the following Examples to illustrate this invention is primarily titanyl 2,9,16,23-tetrafluorophthalocyanine. The method of this invention can be applied to mixtures of two or more pigments but optimum electrophotographic properties are generally obtained when pigments are separately milled and added to the coating composition which is subjected to conventional mixing techniques prior to dispersion coating the electrophotographic recording element.

During the first stage of the method of this invention the pigment is mechanically ground in the dry state under shear conditions that break up particle agglomerates and provide particles having a very small size. As synthesized, titanyl phthalocyanine pigments normally have a particle size that is too large for them to be effectively used in electrophotographic applications. In this condition, they are known in the prior art as "crude" pigments. Such crude pigments normally have a particle size in excess of 10 micrometers, often a particle size of at least 50 micrometers, and in some cases, at least 1 millimeter. In this first milling stage, the particle size is reduced to a particle size that does not exceed about 0.2 micrometer, typically a particle size of about 0.01 to 0.2 micrometer and often about 0.05 to 0.1 micrometer. The pigment particles have a variety of shapes, e.g., elongated, needle-like, spherical, regular or irregular. The particle size referred to herein is the largest dimension of the particle and can be readily determined from electron photomicrographs using techniques well known to those skilled in the art. Milling is carried out in the substantial absence of the solvent and the polymeric binder, i.e., there is either none of these ingredients present or, if some polymeric binder and/or solvent is included, it is in an amount so small as to have no significant detrimental effect on the pigment particles.

In the first stage of the method, the titanyl phthalocyanine pigment particles are milled under shear such that the particle size of the pigment is reduced to at least 0.2 micrometer and the pigment and milling media form a homogeneous mixture. Milling apparatus capable of providing such shear with the milling mixture are well known and include, e.g., conventional ball mills, roll mills, paint shakers, vibrating mills and the like. Examples of milling apparatus that can utilize shearing are described in U.S. Pat. Nos. 4,555,467, issued Nov. 26, 1985 and 4,785,999, issued Nov. 22, 1988. The shear employed with a given mixture is subject to variation, as is obvious to those skilled in the art, depending upon such things as the type of milling apparatus, milling media and titanyl phthalocyanine pigment selected. However, the energy applied to the non-conducting particles in the milling media which results in appropriate shear in the first stage milling generally does not exceed about 5 watts, and is typically in the range of about 3 to 5 watts.

The milling media used in the method of this invention comprises two components, i.e., inorganic salt particles and non-conducting particles in a weight ratio of about 0.5:1 to 3:1, typically about 1:1 to 2:1. Examples of inorganic salts include alkali metal halides, carbonates, sulfates or phosphates such as sodium chloride, potassium bromide, sodium sulfate, potassium sulfate, calcium carbonate, and sodium phosphate. In prior art milling methods where such inorganic salt particles are used in milling media with other particles, e.g., steel balls, they are normally used as milling aids at considerably lower concentrations. Such salts are typically separated from the milled pigment by washing with water since they often have a high degree of solubility in water, e.g., a solubility of at least 200 and often 400 grams of salt per liter of water. Examples of non-conductive particles include materials such as glass particles, zirconium oxide particles and organic polymeric beads such as polymethyl methacrylate beads that are electrically non-conducting. Non-conductive particles are employed because they do not acquire charges due to triboelectrication which charges would cause pigment to adhere to the particles and make isolation of the pigment more difficult. Furthermore, the use of non-conductive particles limits corrosion due to the presence of the inorganic salt particles that could otherwise occur under the milling conditions. The inorganic salts typically have particle sizes in the range of about 5 to 500 micrometers while the particle size of the non-conducting particles is normally in the range of about 0.05 mm to about 5 mm.

Following comminution of the crude pigment in the first milling stage, milling is continued in a second stage at higher shear and at a temperature up to 50° C. Milling is continued at least until there is a perceptible color change of the pigment. This is the point at which there is a just noticeable difference in the color of the pigment which can be detected by observation with the unaided human eye. It is also interesting to note that the titanyl phthalocyanine pigment is substantially completely adsorbed to the surfaces of the inorganic salt particles when milling is completed. This is an excellent indicator of milling completion. During this second milling stage, shear can be increased simply by increasing the concentration of milling media. However, it is often convenient to simply transfer the milled composition from the first stage milling (comprising pigment and milling media) to a device that will develop increased shear relative to the shear used in the first stage. For example, where a ball mill is used is the first stage, this can be followed by using an attritor in the second milling stage, as illustrated in the following Examples. However, other devices such as jet mills or high speed roll mills are suitable for use in the second milling stage. The milling temperature in the second stage does not exceed about 50° C. and is generally in the range of about 0° C. to 50° C., typically in the range of about 20° C. to about 45° C. The milling time, in stages 1 and 2 will vary greatly, depending upon a number of factors such as the relative proportions of pigment and milling media and the specific milling equipment utilized. Generally, a suitable time for the stage 1 milling may be as much as 240 hrs with typical times being in the range of from about 72 to 120 hours while, in the second stage, the milling time is generally about 10 min. to 5 hrs, often about 30 min. to 90 min. Typically, the concentration of the titanyl phthalocyanine pigment during milling is about 0.01% to 10%, often about 0.5% to 5%, by weight, based on the weight of milling media. The milling operation tends to result in a liberation of heat which raises the temperature of the milling composition, i.e., the mixture of pigment and milling media. The milling apparatus is, therefore, normally equipped with cooling means to keep the temperature below 50° C.

Upon completion of stage 2 milling, the temperature of the milled pigment is rapidly increased by at least 10° C. often by 20° to 50° C. The rapid increase in temperature stabilizes the pigment against changes in morphology and crystal form prior to its addition to the solvent solution of polymeric binder. It is usually convenient to increase the temperature of the milled mixture by contacting with hot water, for example, boiling water depending upon the temperature of the milled mixture. However, other heating means, for example, hot air can be used, but water is preferred since it dissolves the inorganic salt particles which facilitates recovery of the pigment. In general, it is neither necessary nor desirable to raise the temperature of the pigment to a temperature above about 100° C., and typically not above about 70° to 90° C. The non-conducting solid particles can simply be removed from the mixture by filtration using any suitable means such as filtration or centrifuging.

As indicated by their X-ray diffraction patterns, the titanyl phthalocyanine pigments prepared according to the method of this invention are quite different from those described in U.S. Pat. No. 4,701,396 and Japanese Patent Application No. 117437/86 referred to previously herein. Thus, the titanyl tetrafluorophthalocyanine particles exhibit peaks at diffraction angles ($2\theta$) of 6.8°, 15.89° and 25.27° in the X-ray diffraction pattern obtained with CuK$\alpha$ radiation while the titanyl phthalocyanine paticles exhibit such peaks at 7.4°, 16.3°, 22.4° and 27.1°. Determination of X-ray diffraction characteristics can be carried out in accordance with well known techniques as described for example in Engineering Solids by T. S. Hutchinson and D. C. Baird, John Wiley and Sons, Inc., 1963, and X-ray Diffraction Procedures for Polycrystalline and Amorphous Materials, 2nd Ed., John Wiley and Sons, Inc., 1974.

Following separation of the milled pigment from the milling media, the pigment is mixed with a solvent solution of polymeric binder to form an electrophotographic coating composition. The pigment can be mixed with the solvent solution of polymeric binder immediately or it can be stored for some period of time before making up the coating composition. The polymeric binder used in the preparation of the coating composition can be any of the many different binders that are useful in the preparation of electrophotographic layers. Representative materials that can be employed as binders in the practice of this invention are film-forming polymers having a fairly high dielectric strength and good electrically insulating properties. Such binders include, for example, styrene-butadiene copolymers; vinyl toluene-styrene copolymers; styrene-alkyd resins; silicone-alkyd resins; soya-alkyd resins; vinylidene chloride-vinyl chloride copolymers; poly(vinylidene chloride); vinylidene chloride-acrylonitrile copolymers; vinyl acetate-vinyl chloride copolymers; poly(vinyl acetals), such as poly(vinyl butyral); nitrated polystyrene; poly(methylstyrene); isobutylene polymers; polyesters, such as poly[ethylene-coalkylenebis-(alkyleneoxyaryl)phenylenedicarboxylate]; phenol-formaldehyde resins; ketone resins; polyamides; polycarbonates; polythiocarbonates; poly[ethylene-coisopropylidene-2,2-bis(ethyleneoxyphenylene)-terephthalate]; copolymers of vinyl haloacrylates and vinyl acetate such as poly(vinyl-m-bromobenzoate-covinyl acetate); chlorinated poly(olefins), such as chlorinated poly(ethylene); cellulose derivatives such as cellulose acetate, cellulose acetate butyrate and ethyl cellulose; and polymides, such as poly[1,1,3-trimethyl-3-(4'-phenyl)-5-indane pyromellitimide].

Suitable organic solvents for forming the polymeric binder solution can be selected from a wide variety of organic solvents, including, for example, aromatic hydrocarbons such as benzene, toluene, xylene and mesitylene; ketones such as acetone, butanone and 4-methyl-2-pentanone; halogenated hydrocarbons such as methylene chloride, chloroform and ethylene chloride; ethers, including ethyl ether and cyclic ethers such as dioxane and tetrahydrofuran; and mixtures thereof. The amount of solvent used in forming the binder solution is typically in the range of from about 2 to about 100 parts of solvent per part of binder by weight, and preferably in the range of from about 10 to about 50 parts of solvent per part of binder by weight.

As previously indicated herein, the electrophotographic elements prepared according to this invention can be of various types, all of which contain photoconductive titanyl phthalocyanine pigments that serve as charge-generating materials in the elements. Such elements include both those commonly referred to as single layer or single-active-layer elements and those commonly referred to as multiactive, multilayer, or multi-active-layer elements which have been briefly described hereinbefore.

Charge generation layers of the novel electrophotographic elements of this invention are characterized by a first spectral absorption peak within the range of about 630 to about 660 nm and a second spectral absorption peak within the range of about 830 to 870 nm. The high absorption in the 600–660 nm range is a significant advantage in addition to good near infrared absorption because the elements can be used in applications employing a He-Ne laser exposure source which requires high sensitivity at about 633 nm. While layers containing either titanyl phthalocyanine or titanyl tetrafluorophthalocyanine particles have a common first spectral absorption peak within the range of about 630 to 660 nm; the second spectral absorption peaks differ. Thus, the second spectral absorption peak for layers containing the titanyl phthalocyanine pigment particles occur within the range of about 830 to 840 nm while those containing the titanyl tetrafluorophthalocyanine particles generally occur in the range of about 840 to 870 nm. Determination of the spectral absorption characteristics of the charge generation layers of the novel electrophotographic recording elements of this invention can be carried out in accordance with well known techniques, as described for example, in Chapter 10 of The Theory of the Photographic Process, Fourth Edition, edited by T. H. James, MacMillan Publishing Company, Inc., New York, N.Y. 1977.

Single layer elements contain one layer that is active both to generate and to transport charges in response to exposure to actinic radiation. Such elements typically comprise at least an electrically conductive layer in electrical contact with a photoconductive layer. In single layer elements prepared using a coating composition made according to this invention, the photoconductive layer contains at least one photoconductive titanyl phthalocyanine pigment as the charge-generation material to generate charge in response to actinic radiation and a transport material which is capable of accepting charges generated by the charge-generation material and transporting the charges through the layer to effect discharge of the initially uniform electrostatic potential. The photoconductive layer is electrically insulative, except when exposed to actinic radiation, and contains an electrically insulative film-forming polymeric binder.

Multiactive elements contain at least two active layers, at least one of which is capable of generating charge in response to exposure to actinic radiation and is referred to as a charge-generation layer (hereinafter also referred to as a CGL), and at least one of which is capable of accepting and transporting charges generated by the charge-generation layer and is referred to as a charge-transport layer (hereinafter also referred to as a CTL). Such elements typically comprise at least an electrically conductive layer, a CGL, and a CTL. Either the CGL or the CTL is in electrical contact with both the electrically conductive layer and the remaining CGL or CTL. The CGL contains at least a photoconductive material that serves as a charge-generation material; the CTL contains at least a charge-transport material; and either or both layers can contain an additional film-forming polymeric binder. In multiactive elements prepared using the coating compositions prepared according to this invention the charge-generation material is at least one photoconductive titanyl phthalocyanine pigment dispersed in a polymeric binder and the element contains a CTL. Any suitable charge-transport material can be used in such CTL's.

Single layer and multilayer electrophotographic elements and their preparation and use, in general, are well known and are described in more detail, for example, in U.S. Pat. Nos. 4,701,396; 4,714,666; 4,666,802; 4,578,334; 4,175,960; 4,514,481; and 3,615,414, the disclosures of which are hereby incorporated herein by reference.

In preparing single-active-layer electrophotographic elements of the invention, the components of the photoconductive layer, including any desired addenda, can be dissolved or dispersed in the coating composition and then coated on an electrically conductive layer or support. The solvent for the polymeric binder is then allowed or caused to evaporate from the mixture to form the permanent layer containing from about 0.01 to 50 weight percent of the charge-generation material and about 10 to 70 weight percent of a suitable charge transport material.

In preparing multiactive electrophotographic elements, the components of the CTL can similarly be dissolved or dispersed in the coating composition and can be coated on either an electrically conductive layer or support or on a CGL previously similarly coated or otherwise formed on the conductive layer or support. In the former case a CGL is thereafter coated on the CTL.

Various electrically conductive layers or supports can be employed in electrophotographic elements prepared using a coating composition prepared according to this invention, such as, for example, paper (at a relative humidity above 20 percent); aluminum-paper laminates; metal foils such as aluminum foil and zinc foil; metal plates such as aluminum, copper, zinc, brass and galvanized plates; vapor deposited metal layers such as silver, chromium, vanadium, gold, nickel, and aluminum; and semiconductive layers such as cuprous iodide and indium tin oxide. The metal or semiconductive layers can be coated on paper or conventional photographic film bases such as poly(ethylene terephthalate), cellulose acetate and polystyrene. Such conducting materials as chromium and nickel can be vacuum-deposited on transparent film supports in sufficiently thin layers to allow electrophotographic elements prepared therewith to be exposed from either side.

When a photoconductive layer of a single-active-layer element or a CGL of a multiactive element is coated from a coating composition prepared according to this invention, the polymeric binder may, if it is electrically insulating, help to provide the element with electrically insulating characteristics. It also is useful in coating the layer, in adhering the layer to an adjacent layer, and when it is a top layer, in providing a smooth, easy to clean, wear-resistant surface.

The optimum ratio of charge-generation material to polymeric binder may vary widely depending upon the particular materials employed. The charge generating material can be a single pigment or it can be two or more pigments. In general, useful results are obtained when the amount of active charge-generation material contained within the layer is within the range of from about 0.01 to 90 weight percent, based on the dry weight of the layer.

Electrophotographic recordig elements prepared using coating compositions made according to this invention can optionally contain other addenda such as leveling agents, surfactants, plasticizers, sensitizers, contrast-control agents, and release agents and they can be coated using the coating composition described herein using any of the wide variety of coating techniques known in the art for forming such elements. Also, such elements can contain any of the optional additional layers known to be useful in electrophotographic recording elements in general, such as, e.g., subbing layers, overcoat layers, barrier layers, and screening layers.

The following examples are presented to further illustrate the invention.

EXAMPLE 1

A glass vessel of 5.2 liters capacity was charged with 2500 g of glass beads with a diameter of 3 mm and 2160 g of sodium chloride particles having a diameter of 500 micrometers and 200 g of crude dark blue titanyl tetrafluorophthalocyanine pigment having a particle size of 0.5 mm. The mixture was then subjected to shearing in a roll mill for 24 hours at a temperature of 25° C. The resulting mixture was homogeneous and the pigment had not changed color but now had a particle size of only 0.5 micrometer.

Figure 3:
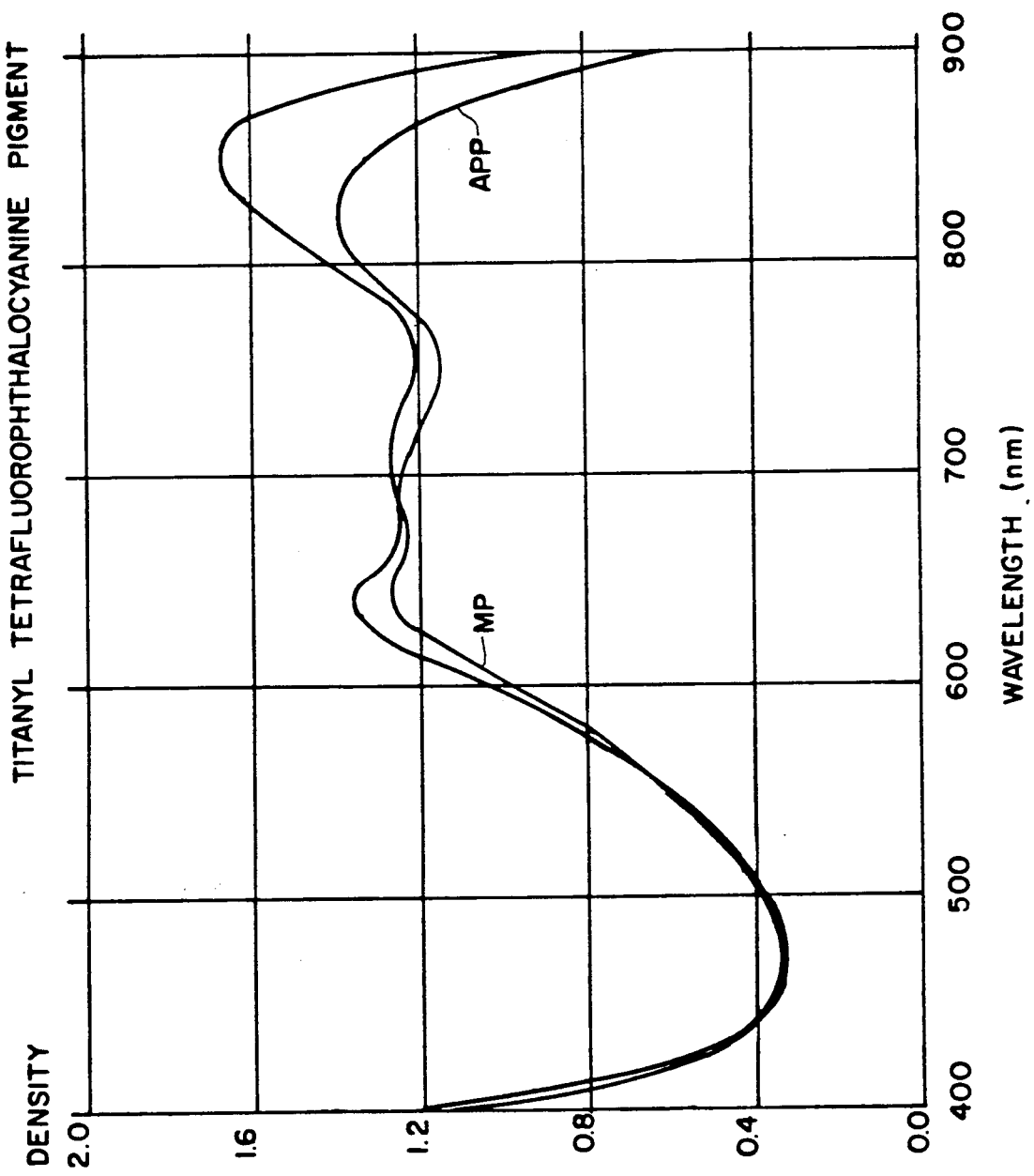
FIG. 3 is a plot representing the spectral absorption curves of the charge-generation layers formed using the milled titanyl tetrafluorophthalocyanine pigment (MP) and the acid pasted titanyl tetrafluorophthalocyanine pigment (APP) having the x-ray diffraction patterns depicted in FIG. 1, prepared as described in the following Example 1.

The milled mixture obtained from the first stage was transferred to an attritor dry grinding vessel having 10 liters capacity and containing a stirrer having a rotating shaft containing 2 pairs of arms fixed to the rotating shaft and extending toward the side wall of the vessel. 2500 g more of the glass beads and 2000 g more of the sodium chloride particles were added to the attritor and the mixture was agitated at 500 rpm for 60 minutes at a temperature of 51° C. These conditions increased the shear on the mixture in comparison to the first stage. The pigment changed from dark blue to light blue in color and was adhered to the surface of the inorganic salt particles. The glass beads were removed from the mixture and the pigment and salt particles were placed in hot water having a temperature of 80°-90° C. Then they were washed with water at 25° C. until no sodium chloride was detected in the rinse water. The pigment particles were dried at a temperature of about 20° C. for approximately 48 hours. The light blue pigment particles had a particle size of 0.2 micrometer and exhibited peaks at X-ray diffraction angles ($2\theta$) of 6.8°, 15.89° and 25.27° in the X-ray diffraction pattern obtained with CuKα radiation. This X-ray diffraction pattern (MP) is depicted in FIG. 1 while the spectral absorption curve for the charge-generation layer containing these pigment particles (MP) and prepared as described later in this Example 1 is depicted in FIG. 3. In comparison, the crude pigment exhibited a more crystalline diffraction pattern with diffraction peaks at 7.1°, 15.9°, and 26.6°.

To illustrate the sensitivity of the pigment to infrared exposure, a coating composition for forming a charge-generation layer (CGL) was prepared by adding 2 g of the titanyl tetrafluorophthalocyanine pigment particles to a 0.85 percent solution of a saturated polyester binder resin (Vylon 200, a product of Toyobo Chemical Co.) in an 80/20, by weight, mixture of dichloromethane and trichloroethane and mixing in a paint shaker for 2 hours. The resulting dispersion was coated on a conductive support comprising a thin conductive layer of nickel on poly(ethylene terephthalate) film to provide a CGL of 1 micrometer thickness.

A coating composition for forming a charge-transport layer (CTL) was prepared comprising 6.5 weight percent solids dissolved in a 50/50, by weight, mixture of dichloromethane and trichloroethane. The solids comprised 4 g of 1,1-bis(4-di-p-tolylaminophenyl)-3-phenylpropane, a charge-transport material, and 6 g of a binder comprising bisphenol A polycarbonate. The coating composition was coated onto the CGL in two layers to achieve the desired thickness and dried to a give a thickness of 22 micrometers. The resulting multi-active layer electrophotographic recording element was then charged to a uniform potential of −500 V, exposed at a wavelength of 840 nm and discharged to −100 V. The energy required in ergs/cm$^2$ (photodecay) was 4.2 ergs/cm$^2$. The dark discharge rate for the element (dark decay) observed 10 seconds after charging was 6 V/sec. Photomicrographs of the electrophotographic recording element established that the photoconductive pigment particles were very well dispersed and no particle agglomerates were in evidence.

For comparison purposes, an electrophotographic recording element was prepared according to this Example except that crude titanyl tetrafluorophthalocyanine having a particle size of 0.5 micrometer obtained by conventional ball milling was used. The electrophotographic element prepared using these particles and tested according to the procedure in of this Example 1 had no detectable photodecay, at 840 nm, i.e., no detectable photosensitivity at 840 nm, and a very high dark decay of 60 V/sec.

In another comparison, an electrophotographic recording element was prepared using the procedure of this Example 1 except that titanyl tetrafluorophthalocyanine pigment particles that were acid pasted according to the procedure of Example 2 of U.S. Pat. No. 4,701,396 and had a particle size of 0.5 micrometer were substituted for the pigment prepared according to this invention in the procedure. These acid pasted particles exhibited peaks at X-ray diffraction angles (2θ) of 6.5°, 15.6° and 26.1° in the X-ray diffraction pattern obtained with CuKα radiation. This x-ray diffraction pattern (APP) is depicted in FIG. 1. The multi-active electrophotographic recording element prepared using these particles and tested according to this Example 1 had a photodecay of 5 ergs/cm$^2$ and a dark decay of 5 V/sec. This illustrates that this invention provides electrophotographic recording elements having photosensitivity in the infrared range that is comparable to those containing acid pasted pigments without the need for acid pasting. Furthermore, the spectral absorption curve for the electrophotographic recording element prepared with the acid pasted pigment exhibited a maximum absorption peak at 820 nm (APP) while the corresponding curve for the electrophotographic recording element containing the pigment prepared according to this invention (MP) in Example 1 exhibited a maximum absorption peak at 850 nm. These spectral absorption curves are depicted in FIG. 3.

EXAMPLE 2

Figure 2:
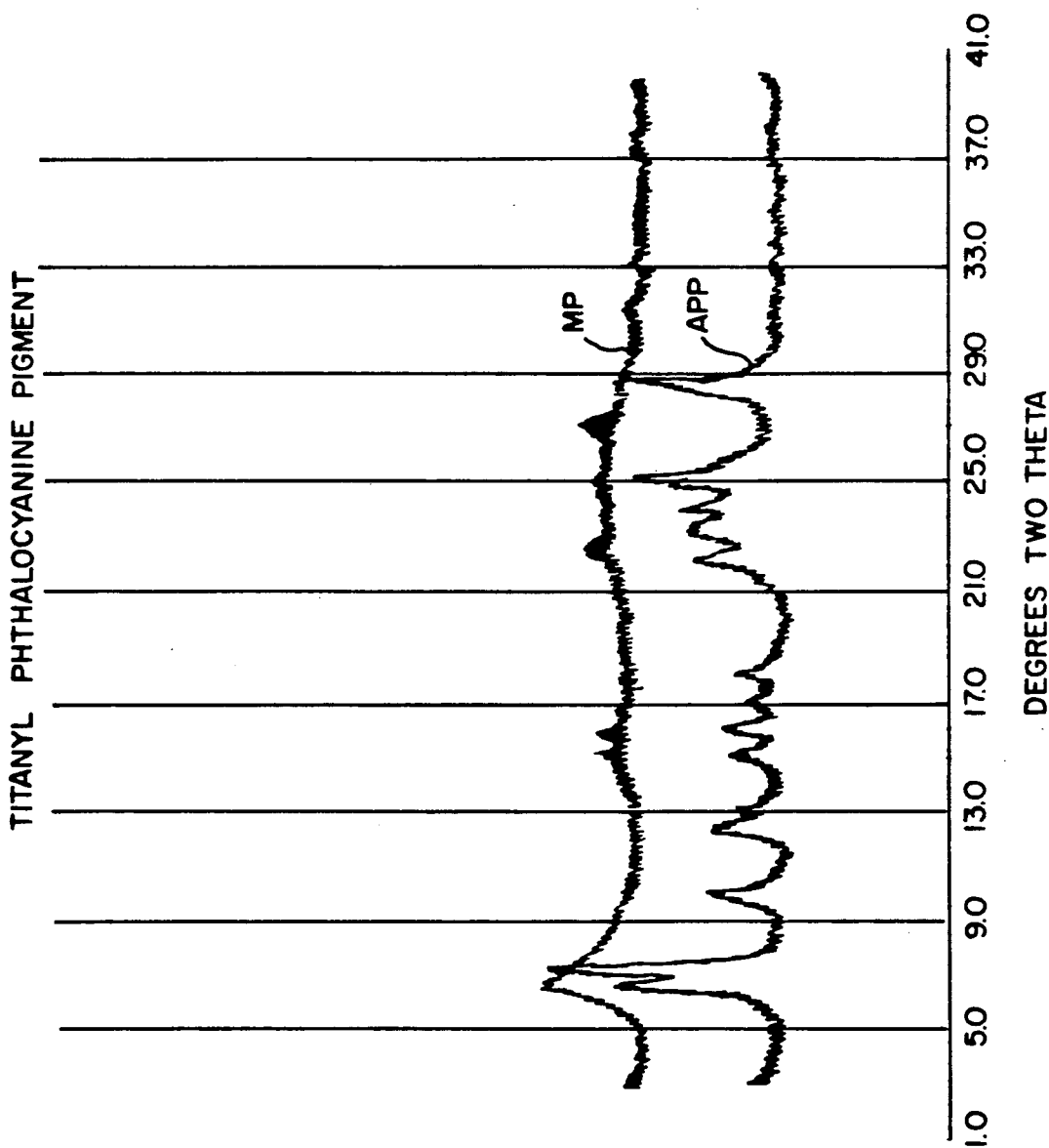
FIG. 2 is a plot representing the x-ray diffraction patterns of milled titanyl phthalocyanine pigment (MP) and acid pasted titanyl phthalocyanine pigment (APP) prepared, respectively, according to this invention and by prior art techniques, as described in the following Example 2.

The milling procedure of Example 1 was repeated except that crude titanyl phthalocyanine pigment having a particle size of 0.5 mm was substituted for the crude titanyl tetrafluorophthalocyanine pigment particles. The milled titanyl phthalocyanine pigment was light blue in color, had a particle size of 0.2 micrometer and exhibited peaks at X-ray diffraction angles (2θ) of 7.4°, 16.3°, 22.4° and 27.1°. This X-ray diffraction pattern (MP) is depicted in FIG. 2. The multi-active electrophotographic recording elements were prepared and tested according to Example 1 using the crude pigment and milled pigment of this invention and an exposure at 830 nm. The results were as follows:

TABLE

| Pigment | Photodecay (ergs/cm$^2$) | Dark decay (V/sec) |
|---|---|---|
| Crude | 28 | 10 |
| Milled | 4.3 | 4 |

For comparison purposes, an electrophotographic recording element was prepared using the procedure of Example 1 with titanyl phtalocyanine pigment particles that were acid pasted according to the procedure of Example 2 of U.S. Pat. No. 4,701,396 and had a particle size of 0.5 micrometer. These acid pasted pigment particles exhibited peaks at X-ray diffraction angles (2θ) of 6.7°, 7.6°, 25.4° and 28.6°. This X-ray diffraction pattern (APP) is depicted in FIG. 2. The multi-active electrophotographic recording element prepared using these pigment particles had a photodecay of 6 ergs/cm$^2$ and a dark decay of 5 V/sec. and exhibited a maximum absorption peak in the infrared range at approximately 830 nm.

EXAMPLE 3

The milling media employed in the practice of this invention is a combination of inorganic salt particles and non-conducting particles. To illustrate the significance of using this combination of particles, the procedure of Example 1 was repeated except that in one run only the glass beads were used as the milling media, while in a second run, only the inorganic salt was used as the milling media. The electrophotographic elements coated from the titanyl tetrafluorophthalocyanine pigment dispersions prepared with these milling media and tested according to the procedure of Example 1 using an exposure at 830 nm had the following Photodecay and Dark Decay values.

TABLE

| Milling Media | Photodecay (ergs/cm$^2$) | Dark decay (V/sec) |
|---|---|---|
| glass beads | 300 | 60 |
| sodium chloride | 200 | 50 |

The photodecay and dark decay values reported in the above Table clearly illustrate that the use of the combination of inorganic salt and non-conducting particles as the milling media is necessary in the practice of this invention. Also, there is a similar decrease in photosensitivity when the weight ratio of the inorganic salt is less than about 0.5:1 with respect to the non-conductive particles.

The invention has been described in detail with particular reference to preferred embodiments thereof, but it will be understood that variations and modifications can be effected within the spirit and scope of the invention.

We claim:

1. A method of making an electrophotographic coating composition having finely-divided photoconductive pigment dispersed in a solvent solution of polymeric binder comprising:
   (1) milling under shear conditions in the substantial absence of said solvent,
      (a) a crude titanyl phthalocyanine pigment having the formula:

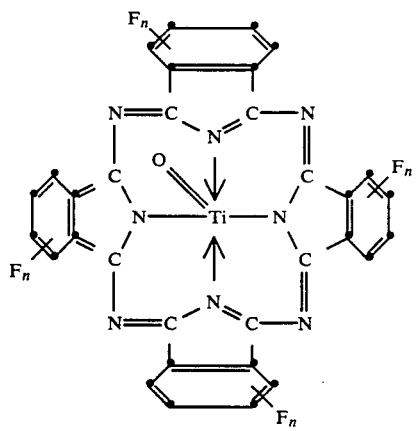

where each n is 0 or each n is 1, with
      (b) milling media comprising inorganic salt and non-conducting particles in a weight ratio of about 0.5:1 to 3:1 to thereby provide pigment having a particle size up to about 0.2 micrometer,
   (2) continuing said milling at higher shear and at a temperature up to about 50° C. to achieve a perceptible color change of said pigment,
   (3) rapidly increasing the temperature of the milled pigment by at least 10° C.,
   (4) separating said milled pigment from said medium, and
   (5) mixing said milled pigment with said solvent solution of polymeric binder to form said coating composition.

2. The method of claim 1 wherein the crude titanyl phthalocyanine pigment in (a) has an initial particle size of at least 10 micrometers.

3. The method of claim 1 wherein the milled pigment in (b) has a particle size in the range of about 0.05 to 0.1 micrometer.

4. The method of claim 1 wherein the temperature of the milled pigment in (3) is increased up to about 90° C.

5. The method of claim 4 wherein the temperature of the milled pigment in (3) is increased by contacting it with water.

6. The method of claim 2 wherein the inorganic salt particles are sodium halide particles and the non-conducting particles are glass particles.

7. The method of claim 6 wherein the weight ratio of inorganic salt particles to glass particles in (b) is about 1:1 and the inorganic salt particles are sodium chloride particles.

8. The method of claim 2 wherein the titanyl phthalocyanine pigment in (b) is dark blue and milling in (2) is continued until said pigment is light blue.

9. The method of claim 1 wherein n is 0.

10. The method of claim 1 wherein n is 1.

11. An electrophotographic recording element having a layer formed from a liquid composition comprising polymeric binder and dispersed photoconductive titanyl phthalocyanine particles having a particle size up to about 0.2 micrometer:
   (a) said titanyl phthalocyanine having the formula:

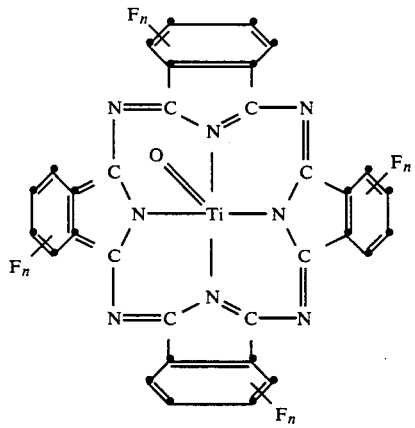

where each n is 0 or each n is 1.
   (b) said particles, where each n is 0, having peaks at diffraction angles ($2\theta$) of 7.4°, 16.3°, 22.4° and 27.1° and, where each n is 1, having peaks at diffraction angles ($2\theta$) of 6.8°, 15.89° and 25.27° in the x-ray diffraction pattern obtained with CuK$\alpha$ radiation, and
   (c) said layer having a first spectral absorption peak within the range of about 630 to about 660 nm and a second spectral absorption peak within the range of about 830 to 870 nm.

12. The electrophotographic recording element of claim 11 wherein each n is 0.

13. The electrophotographic recording element of claim 11 wherein each n is 1.

14. The electrophotographic recording element of claim 11 wherein the titanyl phthalocyanine pigment has a particle size in the range of about 0.05 to 0.1 micrometer.

15. The electrophotographic recording element of claim 12 wherein the second spectral absorption peak is within the range of about 830 to 840 nm.

16. The electrophotographic recording element of claim 13 wherein the second spectral absorption peak is within the range of about 840 to 870 nm.

* * * * *